United States Patent
Sakanoue

(10) Patent No.: US 6,781,367 B2
(45) Date of Patent: Aug. 24, 2004

(54) ROTATION SENSOR

(75) Inventor: Hiroshi Sakanoue, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/136,380

(22) Filed: May 2, 2002

(65) Prior Publication Data

US 2003/0085699 A1 May 8, 2003

(30) Foreign Application Priority Data

Nov. 5, 2001 (JP) ........................................ 2001-339348

(51) Int. Cl.[7] ............................ G01R 33/06; G01P 3/44
(52) U.S. Cl. .................................... 324/207.2; 324/174
(58) Field of Search ........................ 324/207.2, 207.15, 324/207.22, 207.25, 173, 174, 251, 252; 174/17.08, 59

(56) References Cited

U.S. PATENT DOCUMENTS

| | | | | |
|---|---|---|---|---|
| 5,486,758 A | * | 1/1996 | Hammerle | 327/174 |
| 5,929,629 A | * | 7/1999 | Hiraoka et al. | 324/174 |
| 6,392,406 B1 | * | 5/2002 | Palfenier et al. | 324/174 |

FOREIGN PATENT DOCUMENTS

| | | | | |
|---|---|---|---|---|
| DE | 4134881 | * | 10/1991 | ............. G01P/3/44 |
| JP | 7-218238 A | | 8/1995 | |
| JP | 8-201016 A | | 8/1996 | |
| JP | 8-338850 | | 12/1996 | |
| JP | 11-153452 A | | 6/1999 | |
| JP | 11-295331 A | | 10/1999 | |
| JP | 2000-214176 | | 8/2000 | |
| JP | 2000-221206 | | 8/2000 | |
| JP | 2000-234940 A | | 8/2000 | |

* cited by examiner

Primary Examiner—N. Le
Assistant Examiner—Reena Aurora
(74) Attorney, Agent, or Firm—Sughrue Mion, PLLC

(57) ABSTRACT

A rotation sensor includes Hall elements 4 which detect proximity of a magnetic rotation body 3; a permanent magnet 6 which is adjacent to the Hall elements 4 to apply a magnetic field to the Hall elements 4; a main portion 1a on which the Hall elements 4, the permanent magnet 6, and a terminal 7 that is electrically connected to the Hall elements 4 are mounted; and a connector portion 1c in which terminal parts 7a for leading out the terminal 7 to the outside are incorporated. In the rotation sensor, the connector portion 1c is led out in a direction same as the placement direction of the magnetic rotation body 3 and horizontally to the magnetic rotation body 3.

6 Claims, 6 Drawing Sheets

PLACEMENT DIRECTION

PLACEMENT DIRECTION

PLACEMENT DIRECTION

DETECTION DIRECTION −
INSTALLATION DIRECTOIN OF CONNECTOR

US 6,781,367 B2

ROTATION SENSOR

BACKGROUND OF THE INVENTION

1. Field of the Invention

The present invention relates to a rotation sensor which detects the rotation number of, for example, a gear-like magnetic rotation body.

2. Description of the Related Art

FIGS. 5A to 5C are trihedral diagrams showing a conventional rotation sensor, FIG. 5A is a front view (in partial section), FIG. 5B is a plan view (in partial section), and FIG. 5C is a right side section view. Referring to the figures, the rotation sensor is configured by: a sensor main section 1 on which electronic components are mounted, and which is made of an insulating resin; and a bottomed cylindrical case 2 which hermetically covers the sensor main section 1, and which is similarly made of an insulating resin. The sensor main section 1 is configured by a main portion 1a, a pedestal portion 1b, and a connector portion 1c. On the main portion 1a, mounted are an IC 5 configured by two or more Hall elements 4 which are separated from each other by a predetermined distance in order to detect rotation of a magnetic rotation body 3, a permanent magnet 6 which applies a magnetic field to the Hall elements 4, and a terminal 7 on which electronic components for processing output signals of the Hall elements 4 are mounted and a circuit pattern is formed.

The main portion 1a has a generally slender plate-like shape. One end of the main portion is perpendicularly connected to the principal face of the pedestal portion 1b. The permanent magnet 6 is mounted on the other end of the main portion 1a so as to be perpendicular to the main portion 1a. The Hall elements 4 which constitute a sensor element for detecting proximity of a magnetic body are arranged on the outer principal face of the permanent magnet 6.

The connector portion 1c elongates from the other end face of the pedestal portion 1b. The connector portion 1c extends from the other end face of the pedestal portion 1b so as to be bent perpendicularly to the main portion 1a. The terminal 7 which is electrically connected to the permanent magnet 6 of the main portion 1a is embedded in the connector portion 1c. A recessed engaging portion which is to be connected to an external apparatus is formed in the tip end portion having an L-like shape. Terminal parts 7a of the terminal 7 are projected into the engaging portion.

The thus configured rotation sensor is installed in a predetermined position of a vehicle. When the magnetic rotation body 3 which is a magnetic body disposed in opposition to the Hall elements 4 of the rotation sensor, and which has, for example, a gear-like shape is rotated, concave portions 3a and convex portions 3b of the magnetic rotation body 3 alternately approach the Hall elements 4. As a result, the magnetic field which is applied to the Hall elements 4 by the permanent magnet 6 is changed. The change of the magnetic field is detected by the Hall elements 4 as a change of a voltage. The voltage change appearing in the Hall elements 4 is into a pulse wave converted by the electronic components. The electric signal is led out to the terminal parts 7a of the terminal 7 in the connector portion 1c, and then sent to the external apparatus which is not shown, so that the rotation number of the magnetic rotation body 3 is detected.

However, the conventional rotation sensor has the following problem. As shown in FIG. 5C, the connector portion 1c is led out in a direction perpendicular to the placement direction of the magnetic rotation body 3. When there is a structure such as the vehicle body in the direction perpendicular to the placement direction of the magnetic rotation body 3, therefore, it is impossible to install the rotation sensor, and hence the installation place of such a rotation sensor is limited.

There is no interfering structure in the placement direction of the magnetic rotation body 3. Consequently, it may be contemplated that the installation direction of the rotation sensor is rotated by 90° to set the lead out direction of the connector portion 1c coincident with the placement direction of the magnetic rotation body 3. FIG. 6 is a section view showing such a conventional rotation sensor in which the installation direction of the rotation sensor in FIGS. 5A to 5C is rotated by 90° so that the lead out direction of the connector portion 1c is coincident with the placement direction of the magnetic rotation body 3.

In the configuration shown in FIG. 6, however, there arises another problem in that the two Hall elements 4 are arranged in a direction which is perpendicular to the placement direction of the magnetic rotation body 3, and hence it is difficult to detect rotation of the rotation body. This is caused because of the following reason. The difference between the output signals of the two Hall elements 4 is used as the detection output. When the two Hall elements 4 are arranged in a direction which is perpendicular to the placement direction of the magnetic rotation body 3, therefore, the output signals of the two Hall elements 4 are equal to each other, and there is no difference between the signals.

FIG. 7 is a graph illustrating relationships between a detection GAP ratio and the lead out direction of the connector portion 1c in the conventional rotation sensor. In the figure, the ordinate of the graph indicates the detection GAP ratio, and the abscissa of the graph indicates the lead out direction of the connector portion 1c. The detection GAP ratio means a ratio of the air gap length (the length of the air gap between the magnetic rotation body 3 and the rotation sensor) at which detection in a certain direction (angle) is enabled, with respect to the air gap length at which detection in an ideal direction (angle) is enabled, and which is set to 1. For example, a detection GAP ratio of 70% means that, when the air gap length at which detection in the ideal direction is enabled is 1, the air gap length at which detection in a certain direction (angle) is enabled is 0.7. The lead out direction of the connector portion 1c in a state where the lead out direction of the connector portion 1c is coincident with the placement direction of the magnetic rotation body 3 is set to 0°, and that in a state where the connector portion 1c is led out perpendicularly to the placement direction of the magnetic rotation body 3 is set to 90°.

As shown in the figure, it will be seen that, in the state where the connector portion 1c is led out perpendicularly to the placement direction of the magnetic rotation body 3, i.e., when the placement direction of the two Hall elements 4 is coincident with that of the magnetic rotation body 3, the detection GAP ratio is 100%. By contrast, it will be seen that, in the state where the lead out direction of the connector portion 1c is coincident with the placement direction of the magnetic rotation body 3, i.e., when the placement direction of the two Hall elements 4 is perpendicular to that of the magnetic rotation body 3, the detection GAP ratio is 0%, and the sensor hardly conducts detection.

Therefore, it may be contemplated that the connector portion 1c is led out so that the placement direction of the two Hall elements 4 is coincident with that of the magnetic rotation body 3. FIGS. 8A and 8B are trihedral diagrams showing a conventional rotation sensor, FIG. 8A is a front view (in partial section), and FIG. 8B is a plan view (in partial section). As shown in FIG. 8A, however, the three terminal parts 7a of the terminal 7 are vertically arranged, and hence the height of the connector portion 1c is increased. In this case, therefore, there arises a further problem in that the connector portion interferes with a structure which exists in the vertical direction of the magnetic rotation body 3.

SUMMARY OF THE INVENTION

The invention has been conducted in order to solve the above-discussed problems. It is an object of the invention to provide a rotation sensor which can be installed in a vehicle while its installation position is not restricted.

To achieve the above object, according to the invention, there is provided a rotation sensor including: a sensor element which detects proximity of a magnetic body; a permanent magnet which is adjacent to the sensor element to apply a magnetic field to the sensor element; a main portion on which the sensor element, the permanent magnet, and a terminal that is electrically connected to the sensor element are mounted; and a connector portion in which terminal parts for leading out the terminal to an outside are incorporated, wherein the connector portion is led out in a direction same as a placement direction of the magnetic body and horizontally to the magnetic body.

The terminal parts which are incorporated in the connector portion have a crank-like shape that is led out toward the magnetic body.

The terminal parts of the terminal which are incorporated in the connector portion have a positioning hole, and a positioning pin disposed in a molding die is fittingly inserted into and presses the positioning hole, whereby the terminal parts are bent to be led out horizontally to the magnetic body.

DETAILED DESCRIPTION OF THE PREFERRED EMBODIMENTS

Now, a description will be given in more detail of preferred embodiments of the invention with reference to the accompanying drawings.

Embodiment 1.

Figure 1A:
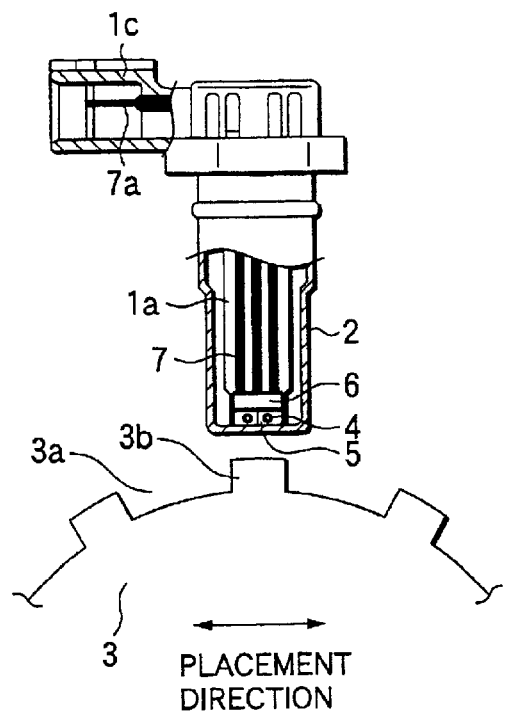
FIGS. 1A to 1C are trihedral diagrams showing a rotation sensor according to Embodiment 1 of the invention.
Figure 1B:
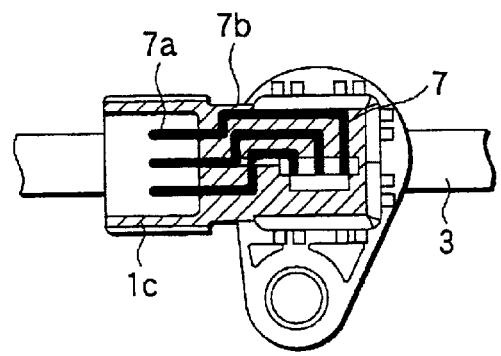
Figure 1C:
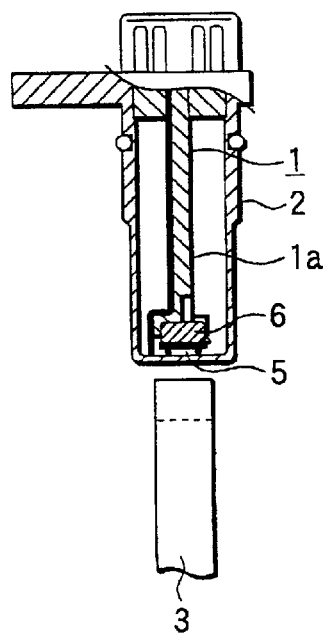

FIGS. 1A to 1C are trihedral diagrams showing a rotation sensor according to Embodiment 1 of the invention, FIG. 1A is a front view (in partial section), FIG. 1B is a plan view (in partial section), and FIG. 1C is a right side section view. Referring to the figures, the rotation sensor is configured by: a sensor main section 1 on which electronic components are mounted, and which is made of an insulating resin; and a bottomed cylindrical case 2 which hermetically covers the sensor main section 1, and which is similarly made of an insulating resin. The sensor main section 1 is configured by a main portion 1a, a pedestal portion 1b, and a connector portion 1c. In the main portion 1a, mounted are an IC 5 configured by two or more Hall elements 4 which are separated from each other by a predetermined distance in order to detect rotation of a magnetic rotation body 3, a permanent magnet 6 which applies a magnetic field to the Hall elements 4, and a terminal 7 on which electronic components for processing output signals of the Hall elements 4 are mounted and a circuit pattern is formed.

The main portion 1a has a generally thin and slender plate-like shape. One end of the main portion is perpendicularly connected to the principal face of the pedestal portion 1b. The permanent magnet 6 is mounted on the other end of the main portion 1a so as to be perpendicular to the main portion 1a. The Hall elements 4 which constitute a sensor element for detecting proximity of a magnetic body are arranged on the outer principal face of the permanent magnet 6.

The connector portion 1c elongates from the other end face of the pedestal portion 1b. The connector portion 1c extends from the other end face of the pedestal portion 1b so as to be bent perpendicularly to the main portion 1a. The terminal 7 which is electrically connected to the permanent magnet 6 of the main portion 1a is embedded in the connector portion 1c. A recessed engaging portion which is to be connected to an external apparatus is formed in the tip end portion having an L-like shape. Terminal parts 7a of the terminal 7 are projected into the engaging portion.

In the thus configured rotation sensor, when the magnetic rotation body 3 which is a magnetic body disposed in opposition to the Hall elements 4, and which has, for example, a gear-like shape is rotated, concave portions 3a and convex portions 3b of the magnetic rotation body 3 alternately approach the Hall elements 4. As a result, the magnetic field which is applied to the Hall elements 4 by the permanent magnet 6 is changed. The change of the magnetic field is detected by the Hall elements 4 as a change of a voltage. The voltage change appearing in the Hall elements 4 is converted into a pulse wave by the electronic components. The electric signal is led out to the terminal parts 7a of the terminal 7 in the connector portion 1c, and then sent to the external apparatus which is not shown, so that the rotation number of the magnetic rotation body 3 is detected.

In the embodiment, as shown in FIGS. 1A to 1C, the terminal 7 is once led out in the direction perpendicular to the placement direction of the magnetic rotation body 3, and the connector portion 1c is then led out in the direction same as the placement direction of the magnetic rotation body 3 and horizontally to the magnetic rotation body 3. Since the lead out direction of the connector portion 1c is coincident with the placement direction of the magnetic rotation body 3, there is no interfering structure in the lead out direction of the connector portion 1c. Therefore, the rotation sensor can be installed while its installation position is not restricted. Since the connector portion is led out horizontally to the magnetic rotation body 3, the three terminal parts 7a of the terminal 7 are horizontally arranged, and hence the height of the connector portion 1c can be prevented from being increased.

As shown in FIGS. 1A to 1C, the embodiment has the structure in which the terminal 7 in the connector portion 1c is led out in the direction perpendicular to the placement direction of the magnetic rotation body 3, and then led out via a crank part 7b in the direction same as the placement direction of the magnetic rotation body 3 and horizontally to the magnetic rotation body 3. Because of the crank part 7b, the terminal parts 7a of the terminal 7 can be placed and led out more inwardly than those in the case where the crank part 7b is not disposed, or on the side of the magnetic rotation body 3, whereby the rotation sensor 1 can be installed without interfering with an apparatus placed in the periphery of the rotation sensor 1.

Embodiment 2.

Figure 2A:
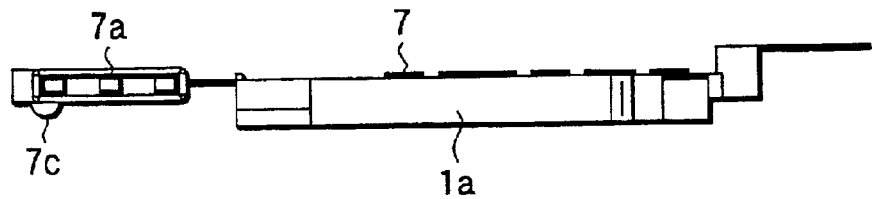
FIGS. 2A and 2B are a section view and a plan view showing a main portion and a terminal of a rotation sensor according to Embodiment 2 of the invention.
Figure 2B:
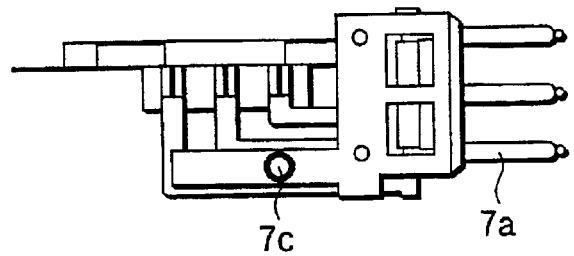
Figure 3:
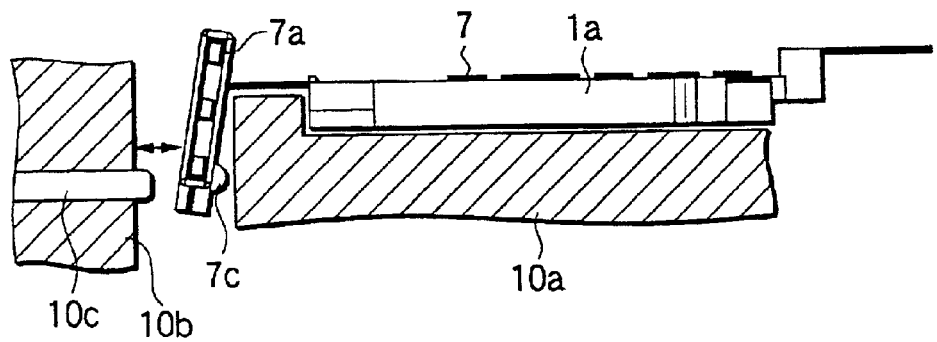
FIG. 3 is a section view showing a process of shaping terminal parts of the terminal of the rotation sensor according to Embodiment 2 of the invention.
Figure 4:
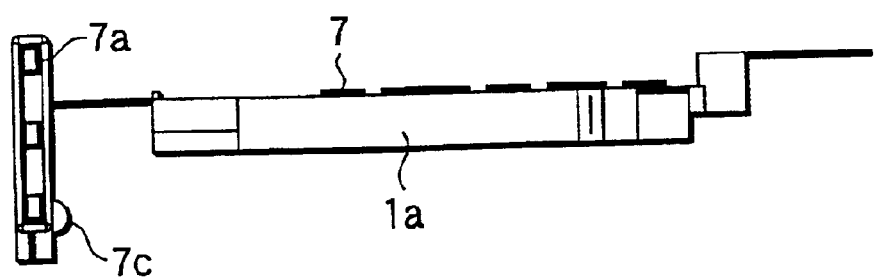
FIG. 4 is a section view showing the shaped terminal parts of the terminal of the rotation sensor according to Embodiment 2 of the invention.
Figure 5A:
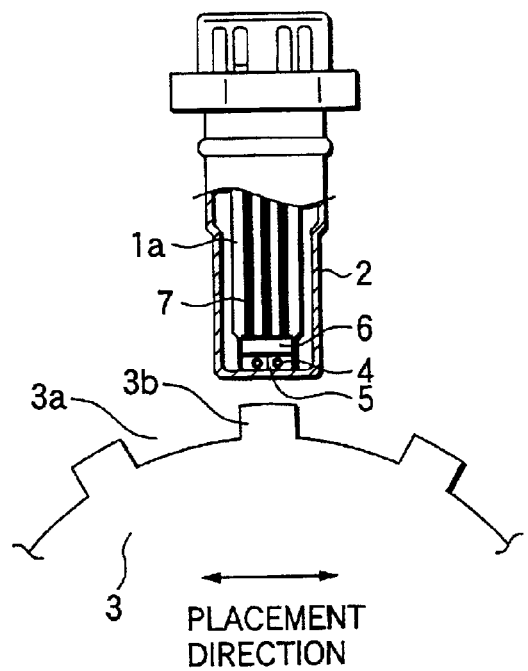
FIGS. 5A to 5C are trihedral diagrams showing a conventional rotation sensor.
Figure 5B:
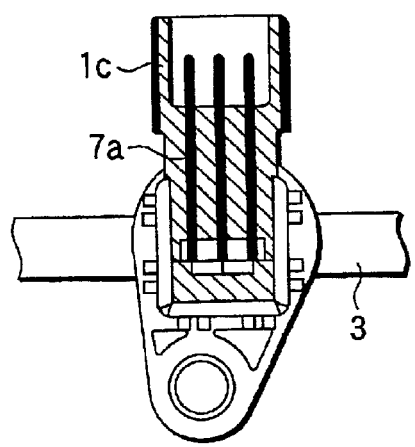
Figure 5C:
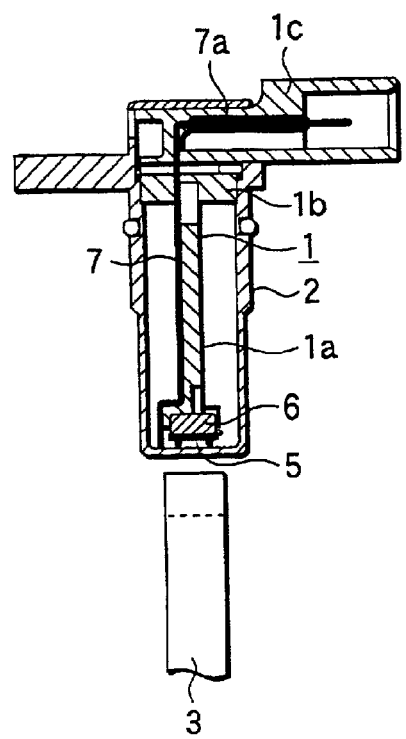
Figure 6:
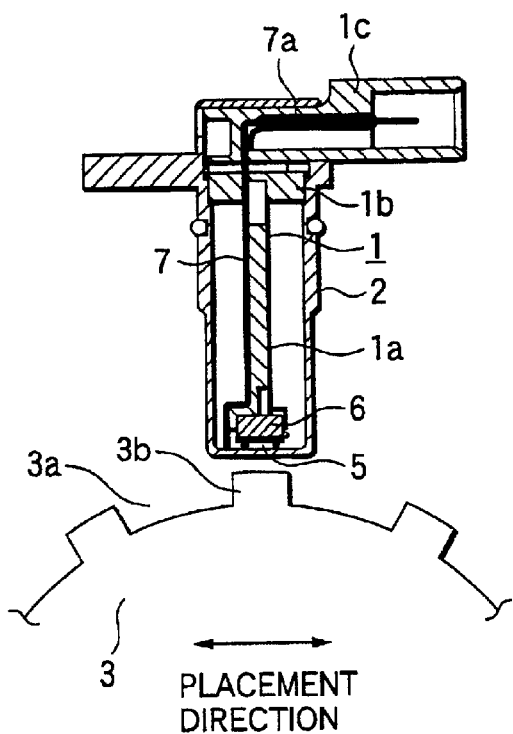
FIG. 6 is a section view showing a conventional rotation sensor.
Figure 7:
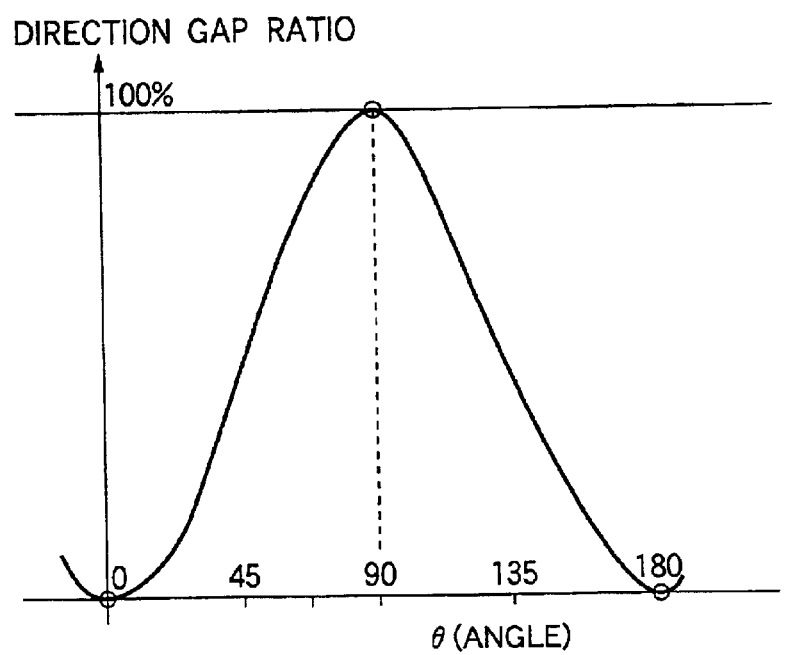
FIG. 7 is a graph illustrating relationships between a detection GAP ratio and a lead out direction of a connector portion in the conventional rotation sensor.
Figure 8A:
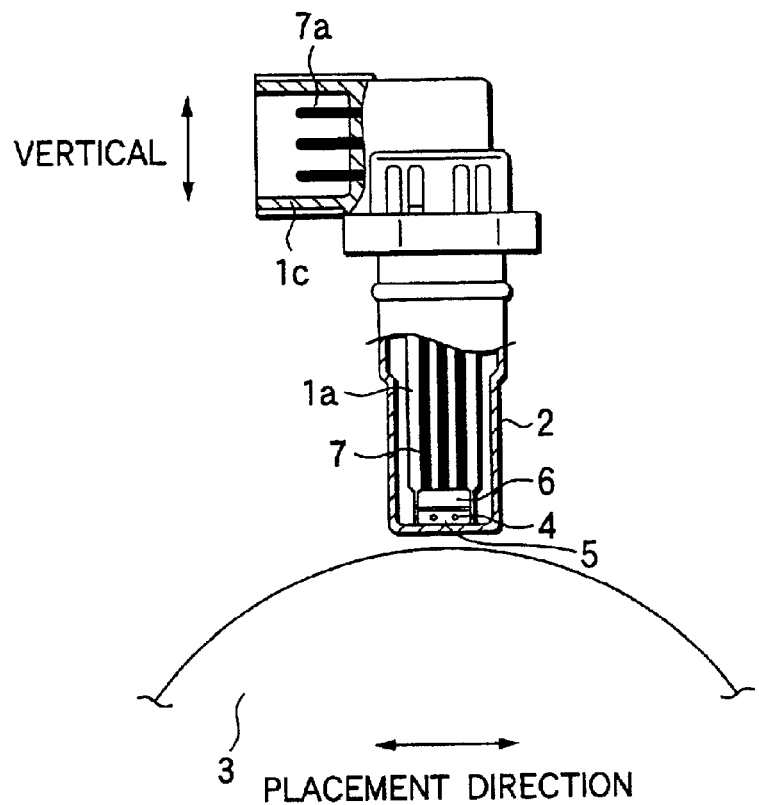
FIGS. 8A and 8B are a front view and a plan view showing another conventional rotation sensor, respectively.
Figure 8B:
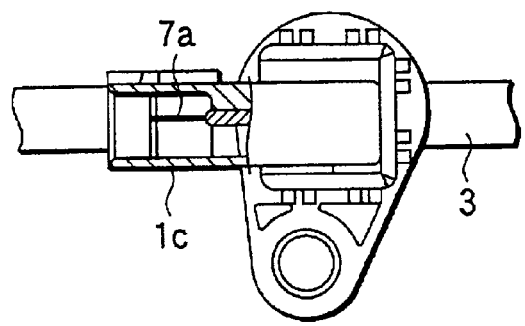

FIGS. 2A and 2B are views showing a main portion and a terminal of a rotation sensor according to Embodiment 2 of the invention, FIG. 2A is a section view, and FIG. 2B is a plan view showing terminal parts of the terminal in FIG. 2A, looking in the direction of the arrow. FIG. 3 is a section view showing a process of shaping the terminal parts of the terminal of the rotation sensor according to Embodiment 2 of the invention, and FIG. 4 is a section view showing the shaped terminal parts of the terminal of the rotation sensor according to Embodiment 2 of the invention.

Referring to FIGS. 2A and 2B, the terminal 7 is mounted on the main portion 1a of the rotation sensor 1. The terminal parts 7a of the terminal 7 are led out in an L-like shape from the terminal 7, and maintained in a horizontal state. A positioning hole 7c is formed in the terminal parts 7a of the terminal 7.

As shown in FIG. 3, the main portion 1a of the rotation sensor 1 on which the terminal 7 is mounted is placed on a molding die 10a, and the terminal parts 7a is bent by about 90° with respect to the terminal 7 by a molding die 10b. A positioning pin 10c which is horizontally movable is disposed in the molding die 10b. The positioning pin 10c is inserted into and presses the positioning hole 7c formed in the terminal parts 7a of the terminal 7, whereby the terminal parts 7a can be surely bent by 90° with respect to the terminal 7 as shown in FIG. 4.

As described above, according to the first aspect of the invention, in a rotation sensor comprising: a sensor element which detects proximity of a magnetic body; a permanent magnet which is adjacent to the sensor element to apply a magnetic field to the sensor element; a main portion on which the sensor element, the permanent magnet, and a terminal that is electrically connected to the sensor element are mounted; and a connector portion in which terminal parts for leading out the terminal to an outside are incorporated, the connector portion is led out in a direction same as a placement direction of the magnetic body and horizontally to the magnetic body. Therefore, it is possible to attain an effect that the rotation sensor can be installed in a vehicle while its installation position is not restricted.

According to the second aspect of the invention, the terminal parts which are incorporated in the connector portion have a crank-like shape that is led out toward the magnetic body. Therefore, it is possible to attain another effect that the rotation sensor can be installed without interfering with an apparatus placed in the periphery of the rotation sensor.

According to the third aspect of the invention, the terminal parts of the terminal which are incorporated in the connector portion have a positioning hole, and a positioning pin disposed in a molding die is fittingly inserted into and presses the positioning hole, whereby the terminal parts are bent to be led out horizontally to the magnetic body. Therefore, it is possible to attain a further effect that the terminal parts can be surely bent by 90° with respect to the terminal.

What is claimed is:

1. A rotation sensor comprising:
a sensor element which detects proximity of a magnetic body;
a permanent magnet which is adjacent to said sensor element to apply a magnetic field to said sensor element;
a main portion on which said sensor element, said permanent magnet, and a terminal that is electrically connected to said sensor element are mounted; and
a connector portion in which terminal parts for leading out said terminal to an outside are incorporated;
wherein said connector portion is led out in a direction that is the same as a placement direction of said magnetic body;
wherein each of said terminal parts for leading out said terminal to an outside are arranged in substantially a same plane that is horizontal to said magnetic body; and
wherein said magnetic body is disposed so that the largest surface of said magnetic body lies in a second plane, and said second plane is perpendicular to said same plane.

2. A rotation sensor according to claim 1, wherein said terminal parts which are incorporated in said connector portion have a crank-like shape that is led out toward said magnetic body.

3. A rotation sensor according to claim 2, wherein said terminal parts of said terminal which are incorporated in said connector portion have a positioning hole, and a positioning pin disposed in a molding die is fittingly inserted into and presses said positioning hole, whereby said terminal parts are bent to be led out horizontally to said magnetic body.

4. A rotation sensor according to claim 1, wherein said terminal parts of said terminal which are incorporated in said connector portion have a positioning hole, and a positioning pin disposed in a molding die is fittingly inserted into and presses said positioning hole, whereby said terminal parts are bent to be led out horizontally to said magnetic body.

5. A rotation sensor comprising:
a sensor element that detects proximity of a magnetic body;
a permanent magnet that is adjacent to the sensor element to apply a magnetic field to the sensor element;
a terminal that is electrically connected to the sensor element and that extends in a vertical direction of the rotation sensor;
a main portion on which the sensor element, the permanent magnet, and the terminal are mounted; and
a connector portion in which terminal parts for leading out the terminal to an outside are incorporated;
wherein the connector portion is led out in a direction that is the same as a placement direction of the magnetic body and horizontally to the magnetic body; and
wherein each of the terminal parts are arranged in substantially a same plane that is substantially orthogonal to the vertical direction of the rotation sensor.

6. The rotation sensor according to claim 5, wherein the terminal parts that are incorporated in the connector portion have a crank-like shape.

* * * * *